(12) United States Patent
Brown et al.

(10) Patent No.: US 10,643,250 B2
(45) Date of Patent: May 5, 2020

(54) CONTROLLING EFFECTIVENESS OF ONLINE VIDEO ADVERTISEMENT CAMPAIGN

(71) Applicant: Oath Inc., New York, NY (US)

(72) Inventors: Martin Brown, San Francisco, CA (US); Thomas Schmidt, San Francisco, CA (US); Giao Huu Phan, San Francisco, CA (US); Amanda Roever, San Francisco, CA (US); Pravin Savkar, San Francisco, CA (US); Karim Seada, San Francisco, CA (US)

(73) Assignee: Oath Inc., New York, NY (US)

( * ) Notice: Subject to any disclaimer, the term of this patent is extended or adjusted under 35 U.S.C. 154(b) by 388 days.

(21) Appl. No.: 14/472,287

(22) Filed: Aug. 28, 2014

(65) Prior Publication Data
US 2016/0063572 A1 Mar. 3, 2016

(51) Int. Cl.
*G06Q 30/02* (2012.01)
(52) U.S. Cl.
CPC ..... *G06Q 30/0275* (2013.01); *G06Q 30/0242* (2013.01)
(58) Field of Classification Search
USPC ..................................................... 705/14.71
See application file for complete search history.

(56) References Cited

U.S. PATENT DOCUMENTS

| 2010/0293050 A1* | 11/2010 | Maher ............... G06F 17/30699 |
| | | 705/14.46 |
| 2012/0054043 A1* | 3/2012 | Agarwal ................ G06Q 30/02 |
| | | 705/14.71 |
| 2013/0053005 A1 | 2/2013 | Jorey et al. |
| 2014/0095324 A1* | 4/2014 | Cabral ................... G06Q 30/08 |
| | | 705/14.71 |
| 2014/0278981 A1* | 9/2014 | Mersov .................. G06Q 30/02 |
| | | 705/14.53 |

OTHER PUBLICATIONS

International Search Report and Written Opinion issued in PCT/US2015/044045, dated Nov. 6, 2015, pp. 1-4.

* cited by examiner

*Primary Examiner* — Colleen A Hoar
(74) *Attorney, Agent, or Firm* — Cooper Legal Group, LLC (57) ABSTRACT

The disclosure provides technology for managing the placement of advertisements. An ad insertion platform contains one or more lists that allow the ad insertion platform to filter advertisement placements and manage placing advertisement opportunities to the appropriate buyers. The disclosure also provides a database and monitoring software to allow faster querying and management of data for the real time bidding system.

17 Claims, 9 Drawing Sheets

CONTROLLING EFFECTIVENESS OF ONLINE VIDEO ADVERTISEMENT CAMPAIGN

TECHNICAL FIELD

The present disclosure generally relates to digital video advertisement insertion.

BACKGROUND

Many companies use online advertising networks to obtain the opportunity to display advertisements to users. The online advertising networks match content publishers who have opportunities to display advertisements to users and advertisers who wish to advertise to users. Advertising networks seek to efficiently manage the supply of advertisement opportunities with the demand for advertisements. Advertisement exchanges can be used to assist in matching buyers with sellers. However, various advertisement exchanges do not efficiently match publishers with advertisement buyers. Inefficient matching can degrade the brand reputation of a seller or a buyer and can also reduce the profitability and performance of an advertisement exchange system.

SUMMARY

The present document provides methods, apparatus and systems to manage the placement of advertisements on client devices. Provided are examples that illustrate the management of bids and advertisement placements by an ad insertion platform. The ad insertion platform, in some embodiments, utilizes database entries and lists to ensure that buyers are presented with appropriate advertisement opportunities.

In an example aspect, servers and software provide an indication of a video advertisement opportunity to a third party buyer. The video advertisement opportunity is filtered through rules that indicate whether the advertisement is appropriate for a buyer or a publisher. In an embodiment, the rules are provided as whitelists or blacklists that are associated with particular domains. The relationship can be provided as a hash table. In another embodiment, an inverse relationship (e.g., domains associated with particular whitelists or blacklists) is also provided as a hash table. In yet another embodiment, unknown domains are entered into the database and placed on a whitelist or blacklist. The blacklists and whitelists can be defined by the ad insertion platform or predefined by advertisers or publishers. In an embodiment, advertisements are placed directly with publishers if they are whitelisted.

In an embodiment, monitoring software is provided. The monitoring software provides and processes information relating to the advertisement placement. The monitoring software modifies database entries and lists. In an embodiment, disguised domains are blacklisted for all buyers. In another embodiment, the blacklists or whitelists can be tuned based on certain factors such as time, site content, publisher's content, publisher's domain, etc.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. The specific examples or embodiments of the present disclosure may be practiced without some of these specific details. In other instances, certain well-known structures and techniques may have not been shown or described in detail and are part of the present disclosure.

Advertisements on websites may be in the form of static banners or animation. With advances in technologies, video advertisements can be played out to the user prior to providing a video or a webpage that the user has requested (often called pre-rolling). Such video ads can be valuable marketing opportunities for various products or services. In various systems that include video advertisements, a number of coordinated message exchanges may happen "behind the scene" between the time a user selects a video content for viewing or clicks on a link (e.g., a uniform resource locator URL) to the time a video advertisement begins to play out prior to providing the user-requested content. For example, often, the opportunity to display a video advertisement to the user is auctioned to multiple interested parties, or bidders. Responses are received from the multiple bidders and a decision is made based on the received bids and other system operational rules about a winning bid. The winning bidder is then given the opportunity to display the video advertisement to the user. The disclosed implementations relate to various operations, device, and computer programs that enable the control of advertisement delivery. The disclosed technology can be used in various implementations that facilitate the delivery, tracking, and measurement of advertisements such as in an advertisement server or exchange. The disclosed technology can be used for video advertisements in a real-time bidding system. The disclosed technology can be configured to interface with content publishers, advertisers, buyers of advertisement opportunities, third party service providers, and ad insertion platforms to enable efficient generation and transmission of advertisements in, for example, a Real-time bidding (RTB) system.

RTB allows buyers to bid on advertisement inventory using their own decision making technology for video ads. The decisions can, for example, be made on an impression-by-impression basis or on a campaign-wide basis covering several advertisement opportunities. The advertisement inventory can be any type of advertisement opportunity including an opportunity to display video advertisements on a client device playing video from a publisher.

RTB enables buyers to decide whether they would like to bid on a particular impression, how much they'd like to pay, and which advertisement or type of advertisement they want to show to the user. Traditional non-RTB models typically require a buyer to serve an advertisement when the advertisement server determines that the impression meets the buyer's need. In the traditional case, the buyer only has an opportunity to optimize the advertisement.

Figure 1:
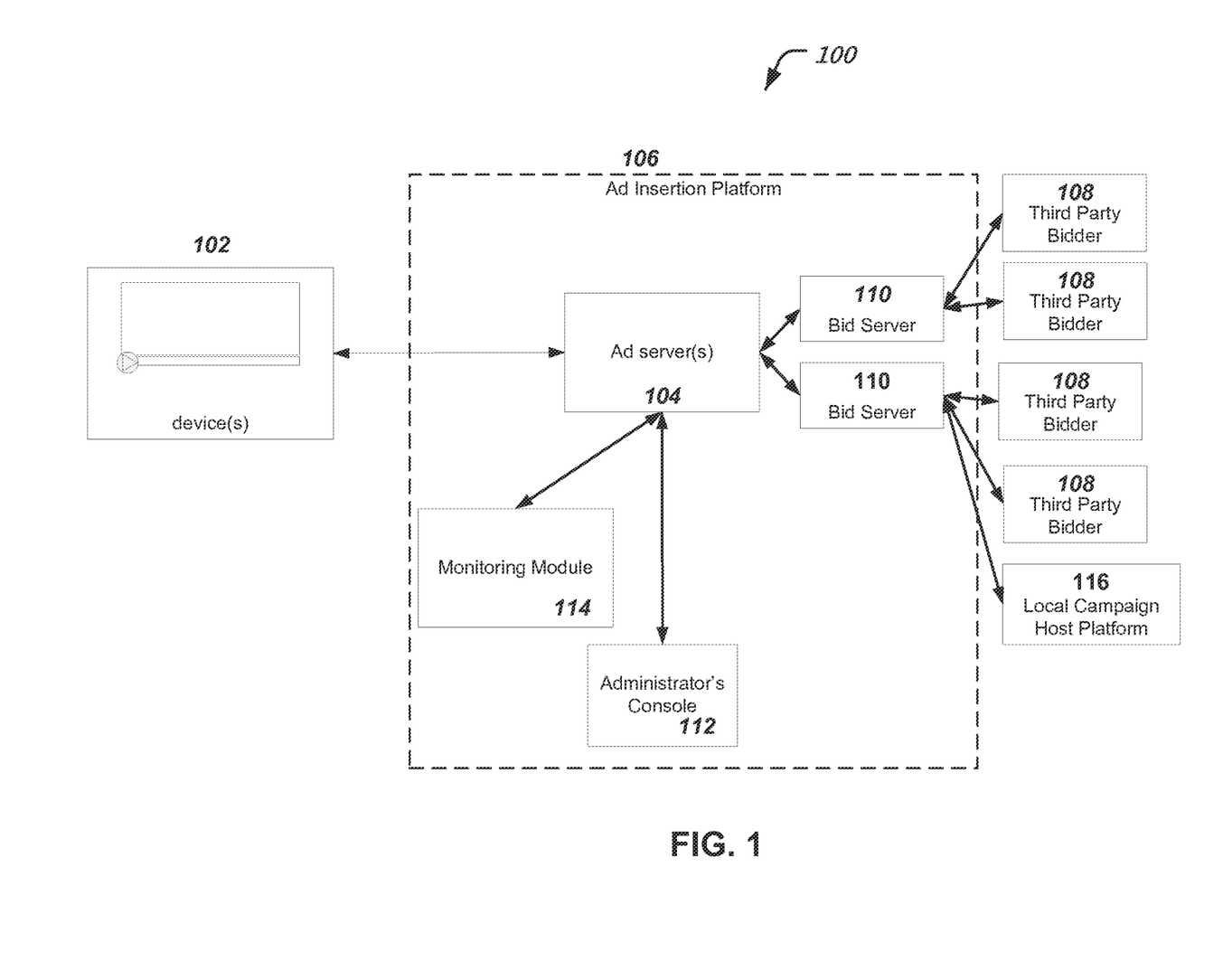
FIG. 1 illustrates an embodiment of an online video advertisement insertion architecture in a real-time bidding (RTB) system.

FIG. 1 illustrates an example of an online video advertisement insertion architecture 100. A device 102 is communicatively coupled with an ad server 104 of a video ad insertion platform 106. The ad server 104 provides a front end entry point to the video ad insertion platform 106. The device 102 may be of any type of device such as a mobile phone, tablet, or computer. The device 102 can be communicatively coupled via a wired connection, a wireless connection, or via any type communications network such as the internet.

The device 102 interfaces with a publisher (not shown) to view content on the device 102. A communication is sent to the video ad insertion platform 106 whenever an opportunity to play an advertisement is present. Advertisement opportunities may include information about the device 102, the user using the device, demographic profile, and other rules associated with the ad placement. Information relating to the publisher, device 102, and advertisement opportunity is passed to the ad server 104. The ad server 104 processes this information and provides the advertisement opportunity to multiple third-party bidders 108 via a plurality of bid servers 110. The bid servers 110 provide a bidding interface between third party bidders 108 and the video ad insertion platform 106. Any number of third-party bidders 108 can be communicatively coupled to any number of bid servers 110. The winning bidder receives the opportunity to deliver a video advertisement to the device 102.

The ad server 104 handles incoming ad requests from one or more devices 102 and responds to the devices 102 indicating whether or not an advertisement will be placed. In an embodiment, the ad server 104 provides the advertisement and associated information for playing the advertisement. In an embodiment, the ad server 104 operates within a time budget to respond to an ad request. For example, the ad server 104 may use a predefined period of 100 milliseconds. The time budget can be set by the administrator or any other user of the video ad insertion platform 106. The time budget retains user focus on the publisher's content. This prevents a perception that publisher's servers are slow and that they are unable to deliver content in a timely manner.

The ad server 104 passes advertisement opportunities to one or more bid servers 110 when the advertisement opportunity is communicated from the device 102 to the ad server 104. The bid servers 110 request bids from one or more third party bidders 108. The ad insertion platform 106 determines the winning based on dollar value. In an embodiment, the ad insertion platform 106 determines a winning bid after a period of time (e.g., 100 milliseconds). In another embodiment, the ad insertion platform 106 determines the winning bid after a bid is received from a predefined number of third party bidders 108. In another embodiment, the ad insertion platform 106 determines a winning bidder by matching a profile, filter, or set of filters and profiles matching the device or viewer. In another embodiment, the ad insertion platform 106 may not pass an advertisement opportunity to one or more third party bidders 108 based on rules set up in the video ad insertion platform 106. In an embodiment, the rules may be set up by third party bidders 108 or other users of the ad insertion platform 106 to directly target particular types of advertisement campaigns.

The winning bidder is notified of the winning bid. The winning bidder is provided with information that allows the winning bidder to transmit a video advertisement to the viewer. The number of ad placements and their details may be logged in a database such as a constant database or other format known in the art.

In another embodiment, the ad insertion platform 106 presents advertisement opportunities to a third party on a campaign-wide basis before any single advertisement opportunity is presented. This allows the advertisements to be played on the device 102 to be matched with certain campaign rules set by the buyer. For example, some advertisers may want to target certain demographics or publishers. In another embodiment, the ad insertion platform 106 targets certain third party bidders 108 with advertisements that meet their campaign rules. In another embodiment, the ad insertion platform 106 automatically places advertisements from third parties if their advertising opportunity appropriately matches rules set by the third party or the ad insertion platform 106.

An administrator console 112 is provided to control the operation of the ad server 104 and bid servers 110. The administrator console 112 allows a user to access one or more databases (not shown) communicatively coupled to the video ad insertion platform. The administrator console 112 allows an administrator of the video ad insertion platform 106 to modify data relating to publishers and the rules for presenting advertisement opportunities to certain bidders. In another embodiment, third party bidders are provided access to the administrator console 112 to enable them to set up rules and parameters for their advertisements and advertising campaigns.

A monitoring software module 114 is communicatively coupled to the databases (not shown) of the video ad insertion platform 106 and third party software services. The monitoring software module 114 interacts with third party software services, the ad server, and client side components to modify rules on advertisement delivery and delivery of advertisement opportunities to third party bidders 108.

In an embodiment, a local campaign host platform 116 is coupled to a bid server 110. The local campaign host platform 116 determines whether it wants to serve the one or more stored advertisements (not shown) to the device 102 based on internal logic. Advertisers or advertisement agencies place rules on the placement of stored advertisements on the local campaign host platform 116. In an embodiment, the rules associated with the stored advertisements on the local campaign host platform 116 are associated with a campaign set by an advertiser, advertisement agency, or other entity that has a business relationship with the advertiser. The rules can include information relating to the desired publisher, desired content of the publisher for the advertisement, the device, the user using the device, the user's demographic profile, desired bid amount or range, and other rules associated with the ad placement. In an embodiment, the bids associated with the stored advertisements of the local campaign host platform 116 are compared with the bid response of third party bidders 108. In another embodiment, the local campaign host platform 116 delivers a store advertisement to the device 102 without the ad insertion platform 106 presenting the bid request to the third party bidders 108 in the case that the bid for the stored advertisements is above a certain predetermined threshold. In an embodiment, the stored advertisements can be stored locally, on the cloud, on a dedicated server, or any other storage platform.

In an embodiment, the ad server 104 provides ad data to the device 102 using a VAST (Video Ad Serving Template) format. VAST is a specification by the Interactive Advertising Bureau (IAB) that provides a common ad response format for video players that enables video ads to be served across all compliant video players. A VAST document provided by a RTB system includes a media file that points to a client side component used to collect video ad activities on the client side. The client side component is discussed in more detail below with reference to the intermediary agent software module.

In another embodiment, the content publisher utilizes the VPAID (Video Player Ad-Serving Interface Definition). VPAID establishes a common interface between video players and ad units to allow interactive in-stream ad experiences. VPAID also provides a communication protocol between video players and ad units to allow a single executable ad. The executable ad incorporates software logic that is executed as part of ad playback. The ad can be displayed in-stream with the content publisher's video content.

Any one of the ad servers 104, bid servers 110, the administrator's console 112, and monitoring module 114 may be on a single ad insertion platform offered by a single vendor (e.g., the BRX platform offered by Brightroll, Inc.). Any one of the ad servers 104, bid servers 110, the administrator's console 112, monitoring module 114, and local campaign host platform 116 may be implemented in individual software packages, application programming interfaces, or dedicated servers.

Figure 2:
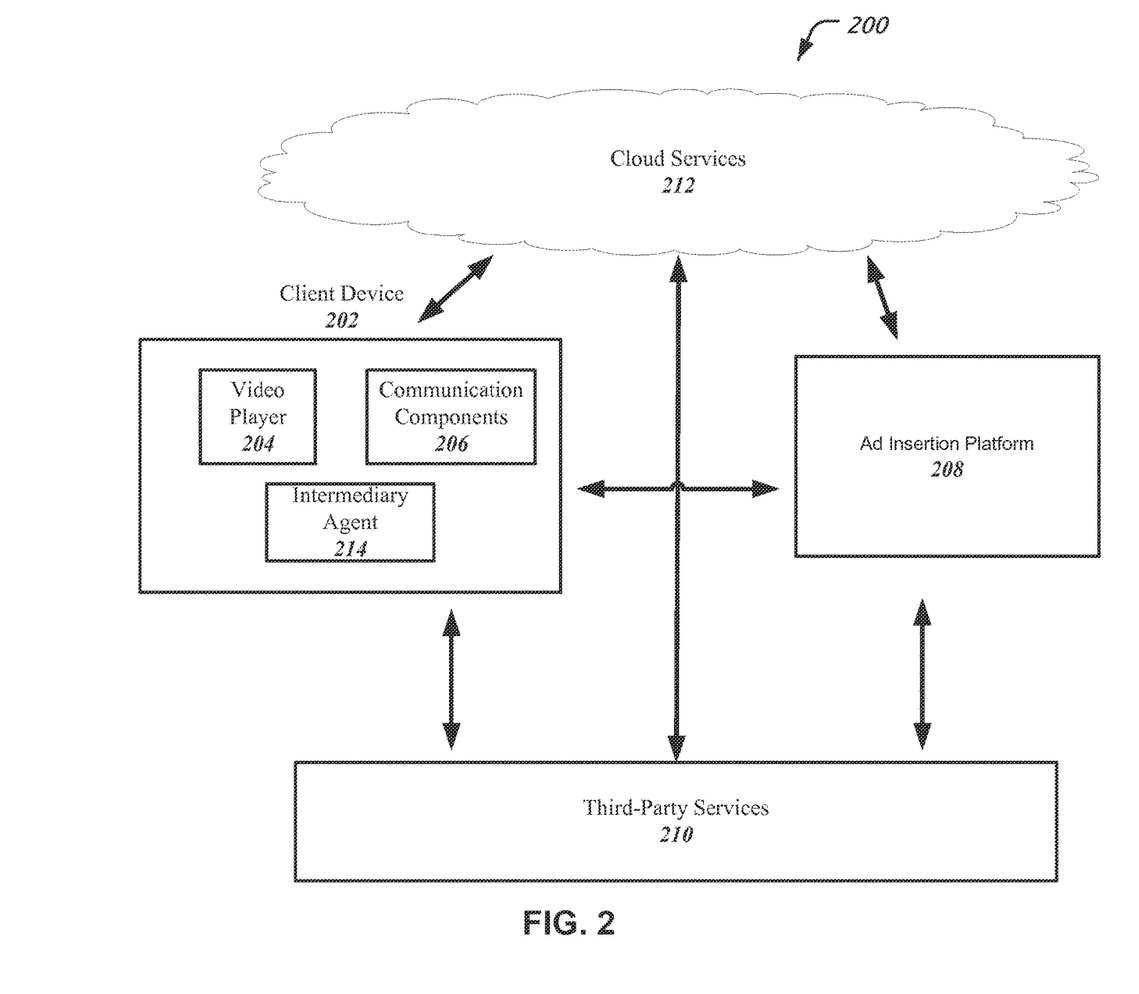
FIG. 2 illustrates an embodiment of an advertisement delivery system in a RTB system.

FIG. 2 illustrates an example advertisement delivery system 200. The client device 202 includes a video player 204 and communication components 206 that are configured to communicate through a network connection with various entities, including the ad insertion platform 208, third party services 210, and cloud services 212. The client device 202 also includes an intermediary agent software module 214. The intermediary agent 214 operates as an interface between the publisher (not shown) and third party services 210 (e.g., tracking and measurement services). The intermediary agent 214 provides various types of tracking information of the client, advertisement, and publisher to the third party services 210, cloud services 212, and the ad insertion platform 208.

The intermediary agent 214 provides information to third parties 210 such as, for example, third-party tracking and measurement services (e.g., Nielsen, comScore, Telemetry, etc.). The third party services 210 can process this information and provide various additional information such as demographic information about the users, popularity of video and audio content, effectiveness of an advertisement campaign, and other tracking and measurement services to the ad insertion platform 208. The ad insertion platform 208 can use the third-party services to, for example, obtain age and demographic information to better facilitate the bidding process and placement of a video advertisements.

In an embodiment, the intermediary agent 214 also communicates information of the ad placement on the device 202 to the ad insertion platform 208. The ad insertion platform 208 can periodically poll the third party services 210 for information relating to ad placements, set up periodic pushing of data from the third party services 210 to the ad insertion platform 208, and obtain information from the third party services 210 as they process information obtained via the intermediary agent 214.

In some embodiments, the intermediary agent 214 is in the form of a Small Web Format (SWF) file that implements the VPAID specification. The intermediary agent 214 can be loaded, executed, and managed by a VPAID compliant ad player on a client device 202. The intermediary agent software module 214 can accordingly be designed for multiple platforms.

Any one of the client device 202, the ad insertion platform 208, the third-party services 210, or the intermediary agent 214 can be communicatively connected to cloud services 212. The cloud services 212 can, for example, enable storage and retrieval of data, provide databases, execute applications, provide authentication, and other functionalities known in the art.

The code of the intermediary agent software module 214 can be modified to include, for example, new third party services, changes to how existing third party services are used, changes to the information collected, and changes to the communications links. The third party services 210 can provide their own libraries that can be loaded onto the intermediary agent 214. For example, the intermediary agent 214 can embed or execute third party JavaScript or SWFs. The third party libraries can perform functions such as the collection of information needed by the third party service. The third-party service may conduct additional operations to accumulate, process, and analyze the data. In an embodiment, the third party service may conduct inquiries to other databases to obtain complementary information needed to achieve a particular tracking and measurement objective.

In an embodiment, third party services 210 provide processed information to the ad insertion platform 208. In another embodiment, the intermediary agent 214 provides processed information to the ad insertion platform 208 directly or to cloud services 212 that provide similar functionality to that of the third party services 210 but are proprietary to the ad insertion platform 208. In another embodiment, the intermediary agent 214 can provide information to cloud services 212 or the ad insertion platform 208 so that they may be populated into a database. Information from the intermediary agent 214 can be used to populate campaign and advertising information based on advertisement and client information.

Data from third party services 210 or the intermediary agent 214 can be in the form of a file (e.g., comma separated values (CSV)). In another embodiment, the intermediary agent 214 can directly manipulate a database through an application programming interface or other software method known in the art. In another embodiment, the intermediary agent 214 can run programs on the cloud services 212 to input data in a database through application programming interfaces or other known methods. Data between the intermediary agent 214, the cloud services 212, the ad insertion platform 208, the client device 202, and third party services 210 can be provided to each other during particular time intervals or may be pulled at any time. In an embodiment, the third-party services 210 place data files on an internet accessible file or hosting service (e.g., cloud, etc.). This allows the ad insertion platform to access the third-party data at any time and at any location.

Certain third party bidders may not fulfill payments because advertisements were delivered to undesirable publishers or devices 202. For example, an advertiser may not want their child-related content to appear on adult-focused websites. Advertisers may also refuse to pay for certain domains. Advertisers may also want a narrowly focused campaign. For example, a shoe company may want to focus all their advertisements to sports-themed websites only.

Certain lists (e.g., a blacklist or a whitelist) can be created based on mined data from the intermediary agent 214, third party services 210, or information in the ad insertion platform 208 to more efficiently manage where bids should be presented to third party bidders. In another embodiment, lists can be used to automatically place advertisements on devices. Lists can be used to filter how content is delivered via a software module, on a dedicated server, or via software interacting with database queries.

Figure 3:
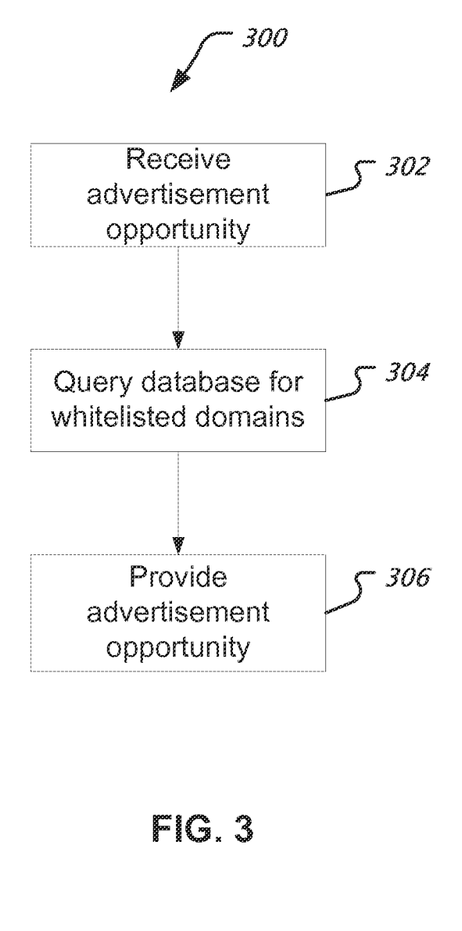
FIG. 3 illustrates an embodiment of a filtering flow using a whitelist in a RTB system.

FIG. 3 illustrates an example filtering flow 300 using a whitelist. The whitelist comprises acceptable situations (e.g., approved publisher domains) for when an advertisement should be delivered. A video ad insertion platform would receive an advertisement opportunity 302, query a database for advertisers who have whitelisted the domain 304, and then provide the advertisement opportunity to third party bidders 306. In another embodiment, advertisements are automatically placed with publishers if the advertiser has previously indicated that they would like to place advertisements on sites such as the publisher's. The whitelist can cover any type of scenarios where delivery of an advertisement to a publisher is desirable. In an embodiment, certain types of domain or subdomain names can be added to a whitelist. For example, disney.com may be whitelisted for toy manufacturers. In another embodiment, the whitelists can be tuned. For example, a whitelist can be time restricted and only applied in the case that advertisements should be delivered at certain times. In an embodiment, advertisements for toys for children aged 7-10 are whitelisted for delivery between 4 and 8 PM.

Figure 4:
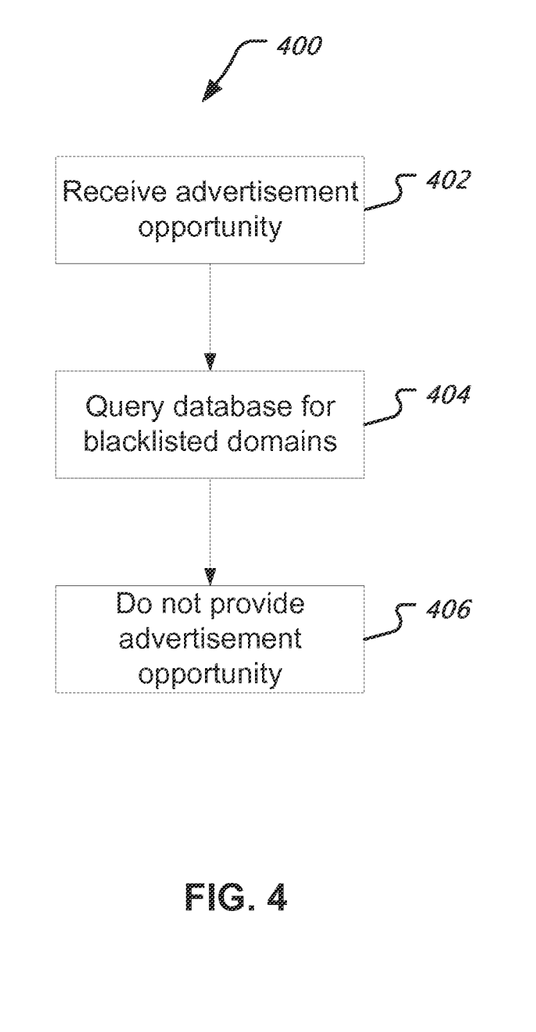
FIG. 4 illustrates an embodiment of a filtering flow using a blacklist in a RTB system.

FIG. 4 illustrates an example filtering flow 400 using a blacklist. The blacklist comprises situations (e.g., publisher domains) when advertisements should not be delivered. A video ad insertion platform would receive an advertisement opportunity 402, query a database for advertisers who have blacklisted the domain 404, and then refuse to provide the advertisement opportunity to bidders having the domains blacklisted 406. A toy manufacturer, for example, may desire to blacklist all adult themed websites. They may further seek to blacklist a domain. As an example, blacklisted.com may be added to the blacklist for a particular advertiser. In an embodiment, this would blacklist all sub-domains of the blacklisted domain. In another embodiment, sub-domains of blacklisted domains can be whitelisted. For example, whitelisted.blacklisted.com can be whitelisted despite the fact that blacklisted.com is blacklisted. In another embodiment, the advertisement opportunity can be presented to all other bidders that have not blacklisted the domain. In an embodiment, the lists can be stored as a separate file or a separate database.

Whitelists can be associated with quality advertisement opportunities that are defined by the bidders themselves or by the video ad insertion platform. Advertisers can compile lists of high quality domains that they'd like to run on to optimize campaigns toward certain demographics. Blacklists can be used by advertisers to avoid associating their brand with inappropriate websites such as websites relating to drugs, pornography, or low quality content such as click farms or computer-generated content.

In an embodiment, the lists can be applied at an organization level to encompass an entire organization (e.g., Kellogg's). The organization can identify particular blacklist and whitelist items. The lists can also be applied to a particular advertisement. For example, Kellogg's may choose to blacklist or whitelist certain domains for a particular cereal advertisement. In another embodiment, the video ad insertion platform creates whitelists and blacklists based on what situations that it believes Kellogg's will pay for.

The organization level and advertisement level lists can be logically configured so that one list takes precedence over another. For example, a blacklist could be set to override all other lists and filters in the video ad insertion platform. As another example, placing a domain in one whitelist can override all other previous lists and filters in the video ad insertion platform. As another example, organization level lists can override advertisement level lists and vice versa.

In another embodiment, software is provided to remove items from one list based upon predefined conditions. For example, placing a domain in an organizational blacklist would automatically remove all instances of that domain in an advertisement level whitelist. This may occur, for example, if an advertiser no longer wants to associate their brand with a publisher that they had previously supported. In an embodiment, the video ad insertion platform removes all blacklist entries once a domain is placed into a whitelist. In another embodiment, the video ad insertion platform automatically removes all whitelist entries once a domain is placed into a blacklist. Any level of iterations can be implemented using any number of lists having any level of list precedence.

In another embodiment, ad insertion platforms whitelists certain publishers for certain bidders that they have a good record of payment for. As an example, the video ad insertion platform may whitelist Disney.com for all Kellogg content because information obtained via an intermediary agent software module and payment databases indicates that Kellogg's always pays for advertisement on Disney.com. In another embodiment, the ad insertion platforms can also utilize blacklists to identify what advertisers refuse to pay for what types of publishers. For example, the video ad insertion platform may blacklist pornography websites because Kellogg's may withhold payment of any advertisement that was placed on a pornography website.

The ad insertion platform can query other information to match an advertisement opportunity with a blacklist, whitelist, or any other list. For example, the ad insertion platform can query the database for lists related to the subject matter of the site or video, geographical information, demographic information, time, or any other device information related to the advertisement opportunity. In another embodiment, publishers may indicate blacklist or whitelist information to the ad insertion platform to prevent certain types of advertisements or campaigns from playing on their sites.

Figure 5:
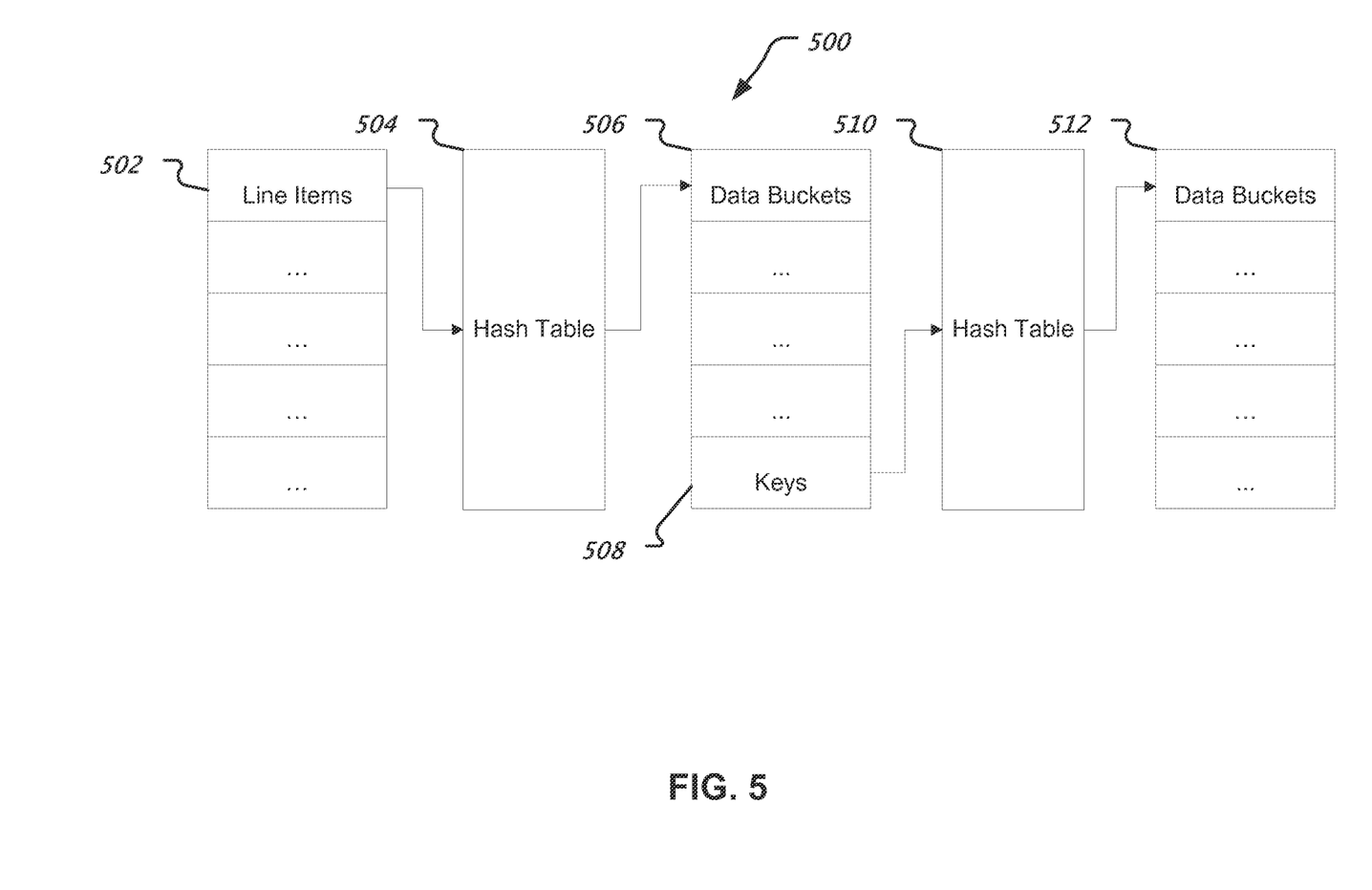
FIG. 5 illustrates an embodiment of a database used by a RTB system.

FIG. 5 illustrates an example database 500 used by a RTB system. The database comprises one or more line items 502 where each line item 502 represents a key associated with advertisement opportunities. Each line item 502 has an entry on a hash table 504 that maps the line items 502 to respective data buckets 506. Each data bucket 506 contains one or more data entries related to a type of data such as domain names. The data represented in each data bucket 506 can be any type of data or a mixture of different types of data. In an embodiment, the line items 502 can also be keys representing information relating to advertisement descriptors, publisher descriptors, content description, domain information, subdomain information, IP address information, organization information, campaign relationships, temporal information, seller information, pricing information, placement information (i.e., top, bottom, etc.), and quality scores.

In another embodiment, one or more data buckets 506 can contain one or more keys 508. The keys 508 have a second hash table 510 that maps the keys 508 to another set of data buckets 512. The second set of data buckets 512 can contain any data type values. For example, Keys 508 can represent lists (e.g., blacklists or whitelists) associated with a line item 502. In another embodiment, the blacklists and whitelists are represented as line items 502 and each respective data bucket 506 contains domain information. The blacklists can comprise domains which provide brand inappropriate content or disguised domains (e.g., a site related to pornography pretending to be kid-safe content). The whitelists can comprise confirmed and brand safe domains.

Figure 6:
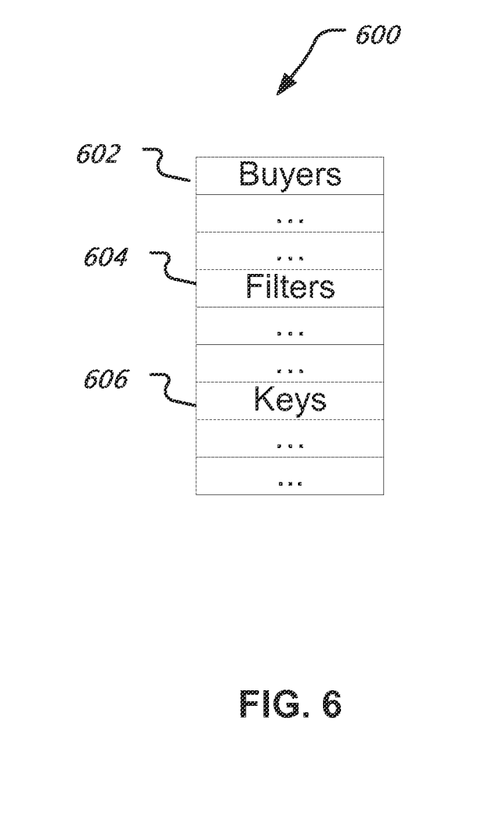
FIG. 6 illustrates an embodiment of a global list of known buyers included in a database used by a RTB system.

FIG. 6 illustrates an example global list 600 of known buyers. The global list 600 comprises one or more entries of buyers 602 who would purchase an advertisement opportunity. In an embodiment, the advertisement is represented as a line item where the global list 600 is a data bucket as illustrated in FIG. 5. In another embodiment, global lists are in one or more separate databases. In another embodiment, information for the buyers 602 can be populated via past purchase history. In another embodiment, information for the buyers 602 can be populated via buyer supplied information. In another embodiment, information for the buyers 602 can be populated via RTB perceived willingness to purchase. In another embodiment, the list of buyers 602 are filtered through whitelists and blacklists before the global lists 600 are populated.

The global list 600 can include any number of records entries. In an embodiment, the global list 600 includes filters 604 such as whitelists or blacklists that are associated with each line item. In an embodiment, the ad server takes the blacklist or whitelist information and determines whether an advertisement should or should not go to a particular third party bidder. The global list 600 can also include second level keys 606 that are mapped to second level records (not shown) through an index (not shown).

The description of FIGS. 5 and 6 are provided as examples and are not intended to be limiting the data entries and keys discussed. Other records can be included. As an example, records or keys can be information relating to advertisement descriptors, publisher descriptors, content description, domain information, subdomain information, IP address information, organization information, campaign relationships, temporal information, seller information, pricing information, placement information (i.e., top, bottom, etc.), and quality scores. In another embodiment.

Figure 7:
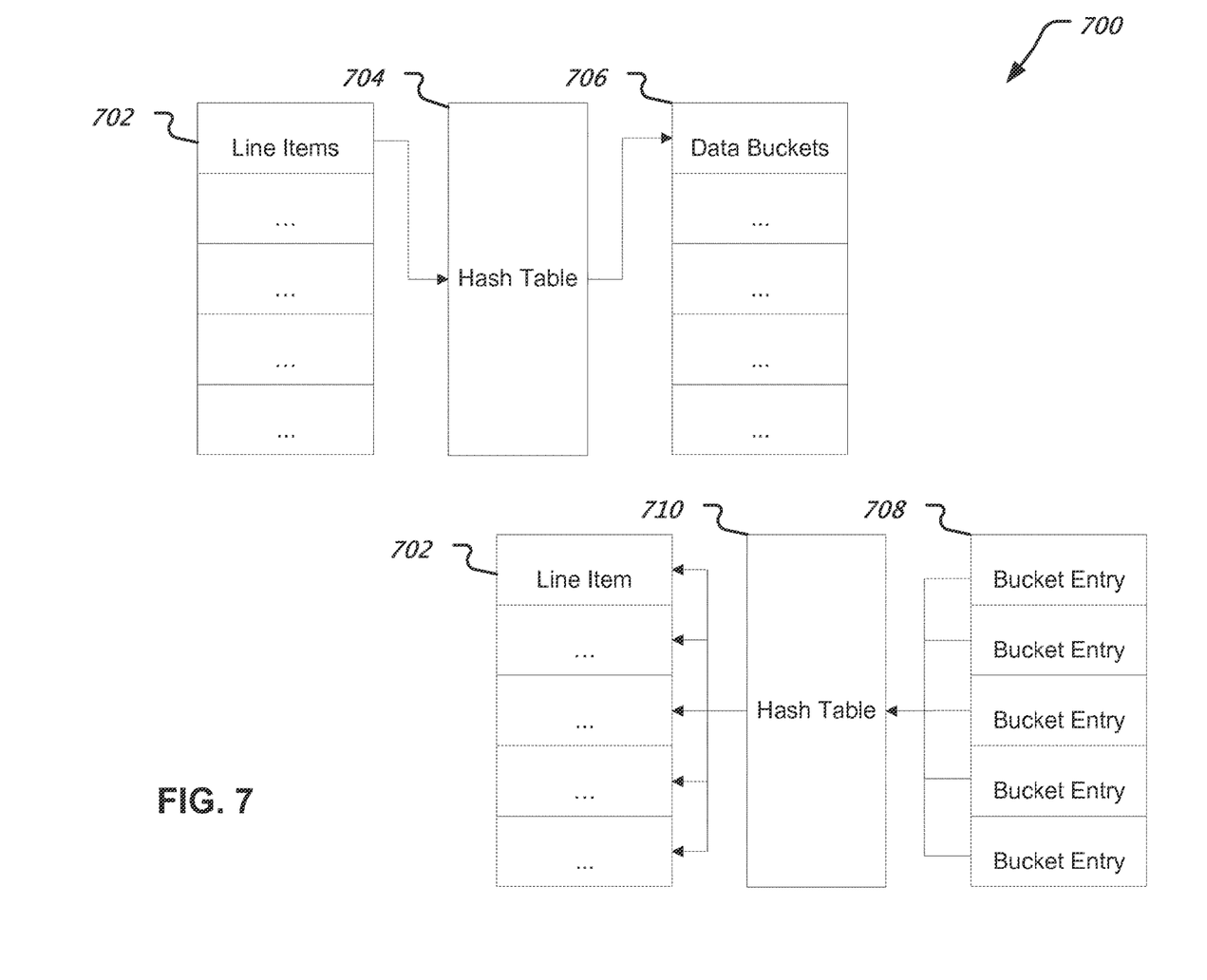
FIG. 7 illustrates an embodiment of an inverse mapping of database entries.

FIG. 7 illustrates an example of an inverse mapping 700 of data base entries. As previously mentioned, a line item 702 is a key that uses a hash table 704 to point to a data bucket 706. In an embodiment, one entry of a particular data bucket 706 is a domain. This domain, represented as bucket entry 708, may repeat in several other data buckets 706. Additionally, the bucket entry 708 may have several line items 702 associated with it. A secondary hash table 710 is constructed that provides an inverse mapping of the bucket entries 708 to the line items 702. In an embodiment, a domain can be queried and all its associated line items can be known. For example, one or more line items 702 point to entries containing the same domain. In an embodiment, a user could query a domain (represented as a bucket entry 708) and reveal all whitelists and blacklists (represented as line items 702) that the domain is associated with. In another embodiment, a query could be made to a particular buyer (represented as a bucket entry 708) and all advertisement opportunities that they are willing to buy (represented as line item 702) could be obtained.

The data from the databases can be hosted via the cloud or provided on a closed system. In another embodiment, the hash tables can be provided as a single file or in multiple files and can be distributed to various platforms. In an embodiment, the hash table can be pushed to a cloud hosting platform or in a private closed system each time the database is rebuilt with new values. The hash table can be pushed to or pulled by clients who use the database. In an embodiment, there could be time windows when the database is updated (e.g., between 4 and 5 AM). In a further embodiment, the database can be updated periodically (e.g., every 12 hours).

Figure 8:
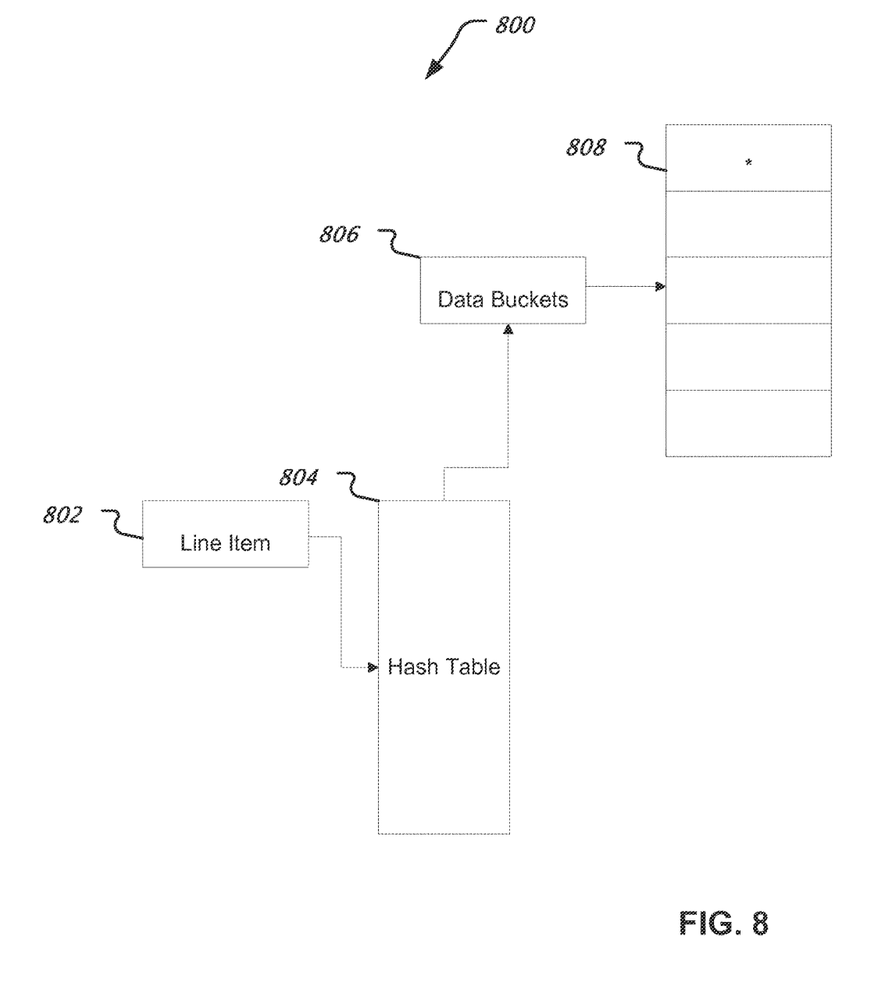
FIG. 8 illustrates an embodiment of a database having entries of unknown domain names.

FIG. 8 illustrates example database having unknown domain names. For a line item 802 (e.g., advertisement inventory), the hash table 804 points to a domain data bucket 806 having a value representing a domain 808. A publisher's domain may not be known to the ad insertion platform if the publisher does not comply with standards, it refuses to pass it, or through error. The unknown domain is represented with a wildcard symbol 808. In this instance, unknown domain 808 is represented as an asterisk. Wildcard domains can also similarly be inversely mapped.

Some buyers may refuse to pay for advertisement placement on domains that are invalid or unknown to them. In embodiments, the ad server would not present invalid or unknown domains to those buyers. Wildcards can be added to a blacklist for that particular buyer so that wildcard domains are never offered to that buyer. In another embodiment, some buyers may want to broaden the reach of their campaign and are willing to pay for wildcard domains. For these buyers, wildcards can be added to a whitelist so that opportunities associated with an unknown domain are passed to them. The willingness to buy wildcard placements can be provided by the buyer themselves or through RTB system monitoring done by the ad server.

In another embodiment, a wildcard risk profile can be established for buyers. The wildcard risk profile provides an assessment regarding whether or not the buyer will pay for unknown or invalid domains. In an embodiment, if a buyer has a high wildcard risk profile, the ad server will not provide advertisement opportunities to the buyer for domains having a wildcard entry. If a buyer has a low wildcard risk profile, the ad server will provide advertisement to the buyer for domains having a wildcard entry. In an embodiment, the wildcard risk profile can be modified via a monitoring algorithm. For example, the intermediary agent software module can collect information based on advertisements served on wildcard domains. This information can be compared with actual payment or bid prices of wildcard domains. The wildcard risk profile would be adjusted accordingly. For example, a buyer's wildcard risk profile can be modified if a certain buyer pays more often than their current wildcard risk profile indicates. In another embodiment, the wildcard risk profile can take volume of wildcard inventory sold to a particular buyer to modify the wildcard profile. Buyers may refuse to pay for advertisement placement if a larger percentage of that placement is on wildcard domains. A software monitoring module can determine whether a wildcard risk profile change correlates with a change in volume of advertisements placed on wildcard domains. If there is a correlation, the wildcard risk profile can be adjusted.

Figure 9:
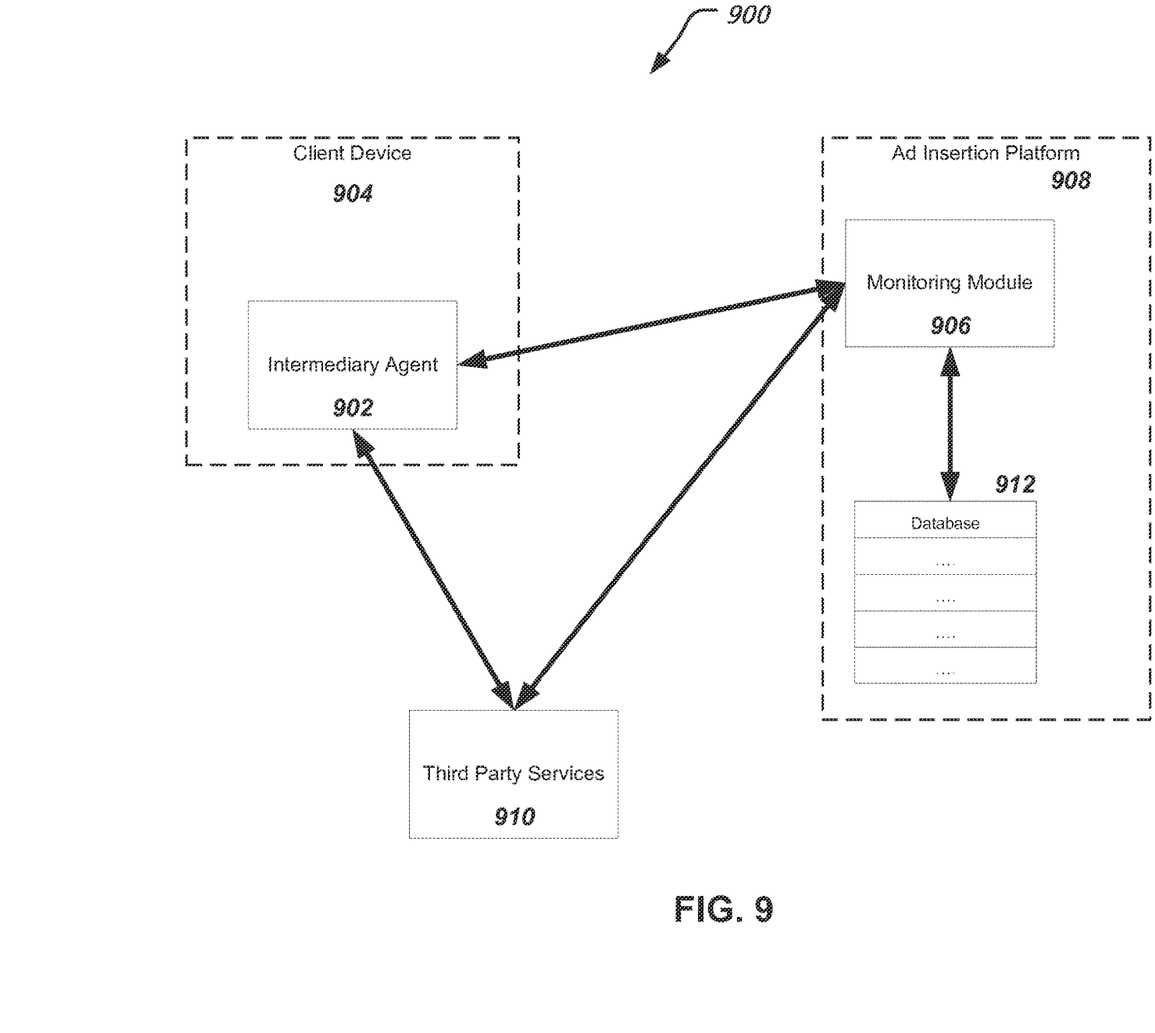
FIG. 9 illustrates an embodiment of an ad monitoring system of a RTB system.

FIG. 9 illustrates an ad monitoring system 900. The ad monitoring system 900 includes an intermediary agent 902. The intermediary agent 902 collects information on client devices 904 where the advertisements are played. The intermediary agent 902 provides information to a monitoring software module 906 on the ad server 908 and other third party services 910. The monitoring software module 906 also interfaces with one or more databases 912. The one or more databases 912 can include one or more databases have information pertaining to purchasing and billing, advertisement inventory, and other types of client and publisher information.

In an embodiment, the monitoring software module 906 provides a second level check on information provided by publishers on advertisements played. For example, a publisher provides domain information before an advertisement opportunity is presented to buyers. Domain name information is also collected by the intermediary agent 902 on the client side after the advertisement is played. In an embodiment, the monitoring software module 906 checks information provided by the intermediary agent 902 with the initial domain information provided by the publisher. The monitoring software module 906 can log any discrepancy in information in the database, a separate database, or in a separate file. This allows the monitoring software module 906 to audit the accuracy of what information publishers are passing to the ad server or the integrity of their rubric.

In an embodiment, the monitoring software module 906 will place a publisher and its domains on a global blacklist maintained in the one or more databases 912 if it identifies a discrepancy in information. The databases 912 and the monitoring module 906 may alternatively be hosted on the cloud accessible by the ad insertion platform 908. In another embodiment, the monitoring software module 906 will place a publisher on a global whitelist of known confirmed domains if the publisher provides consistent information. In another embodiment, the monitoring software module 906 monitors content provided by the publisher with actual information collected by the intermediary agent 902. In another embodiment, the monitoring software module 902 checks global whitelists and global blacklists before making an entry. For example, the monitoring software module 906 removes a previously whitelisted domain from the global whitelist if it determines that the domain needs to be blacklisted globally. In another embodiment, the monitoring module 906 interacts with a billing database to ensure consistency of data.

In another embodiment, the monitoring module 906 monitors the amount of time it takes for an advertisement to be placed after an advertisement opportunity is generated by a client device. The monitoring module 906 can disable certain database queries (e.g., whitelists and blacklists) if they introduce too much latency into ad delivery.

Example embodiments described in this disclosure are not intended to be limiting. The whitelists and blacklists can be applied globally, geographically, on a campaign basis, on an advertiser basis, on an advertisement basis, on a publisher basis, and on a client basis. In addition, multiple blacklists and whitelists can exist for a variety of topics. For example, a database can hold information relating to whitelists of approved domains, whitelists of brand-safe domains, etc. The database can also hold information relating to blacklists of unknown domains, of brand unsafe domains, etc.

The foregoing database structures discussed have been provided as examples and are not intended to be limiting. The disclosure is not limited to a particular type of database. This disclosure is also not limited to storage of information in a database. Information can also be stored as a file or in memory.

Certain aspects of the disclosed technologies can be implemented as a device that includes a processor and a memory comprising processor executable code. The processor executable code, when executed by the processor, configures the device, including the components therein, to perform any one of and/or all operations that are described in the present application. The aspects described can be included in a dedicated server or as software packages and may be communicatively coupled via wire or wirelessly.

For the purposes of illustration, the present disclosure sometimes refers to existing industry standards or specifications as examples of how the disclosed techniques may be used in a real-time bidding system. The disclosed technologies, however, can be used in various real-time bidding systems beyond the specific real-time bidding systems and/or standards mentioned in the examples of the present application.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for providing a multimedia advertisement in a real-time bidding (RTB) system, the method comprising:
   receiving from a client device via a network connection, with a processor of the RTB system, at least one indication of an advertisement opportunity to display a video advertisement at the client device;
   obtaining, with the processor, a list of information relating to the advertisement opportunity, the list of information concurrently comprising (i) at least one blacklist of domains for which a third party bidder will not pay for placement of an advertisement, (ii) at least one whitelist of domains for which the third party bidder will pay for placement of the advertisement, and (iii) a wildcard profile, for the third party bidder, that identifies a willingness of the third party bidder to pay for placement of the advertisement on a domain that is not present on the at least one blacklist and the at least one whitelist;
   determining one or more opportunities associated with the third party bidder based on one or more rules of one or more filters;
   providing the one or more opportunities, comprising opportunities associated with wildcard inventory, to the third party bidder based on the wildcard profile for the third party bidder;
   monitoring behavior, of the third party bidder, associated with the wildcard inventory;
   responsive to determining that the behavior, of the third party bidder, associated with the wildcard inventory is indicative of payments, for at least some of the wildcard inventory, that exceed a threshold indicated by the wildcard profile, generating an updated wildcard profile for the third party bidder by modifying the wildcard profile based on the behavior, of the third party bidder, associated with the wildcard inventory;
   querying, with the processor, after receiving the at least one indication of the advertisement opportunity, the list of information to determine whether to present the third party bidder with the advertisement opportunity based on the at least one blacklist, the at least one whitelist, and the updated wildcard profile associated with the third party bidder; and
   selectively controlling presentation, via a second network connection to the third party bidder, of the advertisement opportunity to display the video advertisement on the client device by:
      presenting, with the processor, the third party bidder with the advertisement opportunity to display the video advertisement on the client device when the advertisement opportunity is associated with the at least one whitelist;
      presenting, with the processor, the third party bidder with the advertisement opportunity to display the video advertisement on the client device when (i) the advertisement opportunity is associated with at least one domain not present on the at least one whitelist and the at least one blacklist and (ii) the updated wildcard profile associated with the third party bidder indicates that the third party bidder will pay for placement of the advertisement on one or more domains not present on the at least one blacklist and the at least one whitelist; and
      preventing, with the processor, presentation to the third party bidder with the advertisement opportunity to display the video advertisement on the client device when the advertisement opportunity is associated with the at least one blacklist.

2. The method of claim 1, wherein obtaining the list of information comprises querying a database, the database comprising at least one mapping of a key to a data entry and at least one inverse mapping of the data entry to the key.

3. The method of claim 2 comprising querying the database for at least one data entry comprising at least one domain name entry, and wherein querying the database for at least one data entry reveals at least one of a blacklist association of the at least one domain name entry or a whitelist association of the at least one domain name entry.

4. The method of claim 1, comprising receiving monitoring information relating to the advertisement played on the client device, where the monitoring information relating to the advertisement is associated with the advertisement opportunity.

5. The method of claim 1, comprising generating a second updated wildcard profile for the third party bidder by modifying the updated wildcard profile based on a volume of wildcard inventory sold to a buyer.

6. The method of claim 1 comprising:
determining whether a change to the updated wildcard profile correlates with a change in volume of advertisements placed on one or more wildcard domains; and
responsive to determining that the change to the updated wildcard profile correlates with the change in the volume of advertisements placed on the one or more wildcard domains, generating a second updated wildcard profile for the third party bidder by modifying the updated wildcard profile.

7. The method of claim 1, comprising:
determining predefined precedence information relating to the at least one blacklist or the at least one whitelist, the predefined precedence information providing an indication relating to how the at least one whitelist or the at least one blacklist should be processed in relationship to other lists.

8. A system to provide an advertisement in a real-time bidding (RTB) system, the system comprising:
a processor; and
memory comprising instructions that, when executed by the processor, are configured to implement:
an ad server module communicatively coupled to a client device and a third party bidder, wherein the ad server module is configured to receive from the client device at least one indication of an advertisement opportunity to display a video advertisement; and
a database module communicatively coupled to the ad server module, where the database module is configured to be queried by the ad server module and is configured to provide information relating to the advertisement opportunity, the database module comprising a list of information relating to the advertisement opportunity, the list of information concurrently comprising (i) at least one blacklist of domains for which the third party bidder will not pay for placement of an advertisement, (ii) at least one whitelist of domains for which the third party bidder will pay for placement of the advertisement, and (iii) a wildcard profile, for the third party bidder, that identifies a willingness of the third party bidder to pay for placement of the advertisement on a domain not present on the at least one blacklist and the at least one whitelist, wherein one or more opportunities associated with the third party bidder are determined based on one or more rules of one or more filters, wherein the one or more opportunities, comprising opportunities associated with wildcard inventory, are provided to the third party bidder based on the wildcard profile, wherein the wildcard profile is generated based on behavior, of the third party bidder, associated with the wildcard inventory;
wherein the ad server module is configured to:
query, after receiving the at least one indication of the advertisement opportunity, the database module to determine whether to present the third party bidder with the advertisement opportunity based on the at least one blacklist, the at least one whitelist, and the wildcard profile associated with the third party bidder;
selectively control presentation, via a network connection to the third party bidder, of the advertisement opportunity to display the video advertisement on the client device by:

present the third party bidder with the advertisement opportunity to display the video advertisement on the client device when the advertisement opportunity is associated with the at least one whitelist;
present the third party bidder with the advertisement opportunity to display the video advertisement on the client device when (i) the advertisement opportunity is associated with at least one domain not present on the at least one whitelist and (ii) the at least one blacklist and the wildcard profile associated with the third party bidder indicates that the third party bidder will pay for placement of the advertisement on one or more domains not present on the at least one blacklist and the at least one whitelist; and
prevent presentation to the third party bidder with the advertisement opportunity to display the video advertisement on the client device when the advertisement opportunity is associated with the at least one blacklist; and
responsive to determining that the behavior, of the third party bidder, associated with the wildcard inventory is indicative of payments, for at least some of the wildcard inventory, that exceed a threshold indicated by the wildcard profile, generate an updated wildcard profile for the third party bidder by modifying the wildcard profile based on the behavior, of the third party bidder, associated with the wildcard inventory.

9. The system of claim 8, wherein the database module comprises at least one mapping of a key to a data entry and at least one inverse mapping of the data entry to the key.

10. The system of claim 9 wherein the database module comprises at least one data entry comprising at least one domain name entry, and wherein the database module is configured to provide at least one of a blacklist association of the at least one domain name entry or a whitelist association of the at least one domain name entry when the database module is queried.

11. The system of claim 8, wherein the ad server module is configured to receive monitoring information relating to the advertisement played on one or more client devices, where the monitoring information relating to the advertisement is associated with the advertisement opportunity.

12. The system of claim 8, wherein the ad server module is configured to generate a second updated wildcard profile for the third party bidder by modifying the updated wildcard profile based on a volume of wildcard inventory sold to a buyer.

13. The system of claim 8 wherein the ad server module is configured to:
determine whether a change to the updated wildcard profile correlates with a change in volume of advertisements placed on one or more wildcard domains; and
responsive to determining that the change to the updated wildcard profile correlates with the change in the volume of advertisements placed on the one or more wildcard domains, generate a second updated wildcard profile for the third party bidder by modifying the updated wildcard profile.

14. The system of claim 8, wherein the database module comprises predefined precedence information relating to the at least one blacklist or the at least one whitelist, where the predefined precedence information provides an indication relating to how the at least one whitelist or the at least one blacklist should be processed in relationship to other lists.

15. A method for providing a multimedia advertisement in a real-time bidding (RTB) system, the method comprising:

receiving from a client device via a network connection, with a processor of the RTB system, at least one indication of an advertisement opportunity to display a video advertisement at the client device;

obtaining, with the processor, a list of information relating to the advertisement opportunity, the list of information concurrently comprising (i) at least one blacklist of domains associated with a third party bidder, and (ii) at least one whitelist of domains associated with the third party bidder;

determining one or more opportunities associated with the third party bidder based on one or more rules of one or more filters;

providing the one or more opportunities, comprising opportunities associated with wildcard inventory, to the third party bidder;

monitoring behavior, of the third party bidder, associated with the wildcard inventory;

responsive to determining that the behavior, of the third party bidder, associated with the wildcard inventory is indicative of payments, for at least some of the wildcard inventory, that exceed a threshold, generating a wildcard profile, for the third party bidder, that is associated with domains that are not present on the at least one blacklist and the at least one whitelist, wherein the wildcard profile is generated based on the behavior, of the third party bidder, associated with the wildcard inventory;

querying, with the processor, after receiving the at least one indication of the advertisement opportunity, the list of information to determine whether to present the third party bidder with the advertisement opportunity based on the at least one blacklist, the at least one whitelist, and the wildcard profile associated with the third party bidder; and selectively controlling presentation, via a second network connection to the third party bidder, of the advertisement opportunity to display the video advertisement on the client device by:

presenting, with the processor, the third party bidder with the advertisement opportunity to display the video advertisement on the client device when the advertisement opportunity is associated with the at least one whitelist;

presenting, with the processor, the third party bidder with the advertisement opportunity to display the video advertisement on the client device when (i) the advertisement opportunity is associated with at least one domain not present on the at least one whitelist and (ii) the at least one blacklist and the wildcard profile associated with the third party bidder indicates that the third party bidder will pay for placement of an advertisement on one or more domains not present on the at least one blacklist and the at least one whitelist; and preventing, with the processor, presentation to the third party bidder with the advertisement opportunity to display the video advertisement on the client device when the advertisement opportunity is associated with the at least one blacklist.

16. The method of claim 15, wherein obtaining the list of information comprises querying a database, the database comprising at least one mapping of a key to a data entry and at least one inverse mapping of the data entry to the key.

17. The method of claim 16 comprising querying the database for at least one data entry comprising at least one domain name entry, and wherein querying the database for at least one data entry reveals at least one of a blacklist association of the at least one domain name entry or a whitelist association of the at least one domain name entry.

* * * * *